(12) United States Patent
Mcfaull et al.

(10) Patent No.: US 12,608,388 B2
(45) Date of Patent: Apr. 21, 2026

(54) METHODS AND SYSTEMS FOR PERFORMING DATABASE OPERATIONS

(71) Applicant: Xero Limited, Te Aro (NZ)

(72) Inventors: Cassandra Mcfaull, Te Aro (NZ); Geoff Thornburrow, Te Aro (NZ)

(73) Assignee: Xero Limited, Te Aro (NZ)

( * ) Notice: Subject to any disclaimer, the term of this patent is extended or adjusted under 35 U.S.C. 154(b) by 0 days.

(21) Appl. No.: 18/675,944

(22) Filed: May 28, 2024

(65) Prior Publication Data

US 2024/0311385 A1      Sep. 19, 2024

Related U.S. Application Data

(63) Continuation of application No. 18/237,529, filed on Aug. 24, 2023, now Pat. No. 12,019,644, which is a continuation of application No. PCT/NZ2023/050002, filed on Jan. 19, 2023.

(30) Foreign Application Priority Data

Jan. 21, 2022    (AU) ................................ 2022900112

(51) Int. Cl.
| | |
|---|---|
| *G06F 16/00* | (2019.01) |
| *G06F 16/2455* | (2019.01) |
| *G06F 16/2458* | (2019.01) |
| *G06F 16/248* | (2019.01) |

(52) U.S. Cl.
CPC .... *G06F 16/2471* (2019.01); *G06F 16/24557* (2019.01); *G06F 16/248* (2019.01)

(58) Field of Classification Search
CPC .......... G06F 16/2471; G06F 16/24557; G06F 16/248
USPC ................................................... 707/600–899
See application file for complete search history.

(56) References Cited

U.S. PATENT DOCUMENTS

| | | | |
|---|---|---|---|
| 8,706,798 B1 * | 4/2014 | Suchter ................... | H04L 67/10 709/224 |
| 9,032,017 B1 | 5/2015 | Singh et al. | |
| 10,621,530 B2 | 4/2020 | Tran et al. | |
| 11,327,970 B1 | 5/2022 | Li et al. | |
| 11,611,529 B1 | 3/2023 | Rubin-Smith et al. | |
| 11,657,069 B1 | 5/2023 | Narayanaswamy et al. | |
| 11,762,860 B1 | 9/2023 | Rahman et al. | |
| 12,013,856 B2 * | 6/2024 | Avalani ................... | G06F 16/25 |
| 2008/0222362 A1 * | 9/2008 | Chang .................... | G06Q 10/06 711/E12.001 |
| 2017/0063936 A1 | 3/2017 | Waas et al. | |
| 2017/0293658 A1 * | 10/2017 | Zhang ............... | G06F 16/24554 |

(Continued)

*Primary Examiner* — Michelle N Owyang
(74) *Attorney, Agent, or Firm* — Young Basile Hanlon & MacFarlane, P.C.

(57) ABSTRACT

Methods for performing a query operation on a database comprise selecting a connection to the database from a plurality of connections to the database, the connections being arranged within a data structure and each having a predetermined number of query slots; waiting for a query slot to be available on the selected connection; in response to determining that the predetermined number of query slots include at least one available query slot, accessing one of the at least one available query slots; reordering the plurality of connections within the data structure; causing the query operation to execute at least partially using the accessed query slot; and releasing the accessed query slot.

20 Claims, 3 Drawing Sheets

300

(56)          References Cited

U.S. PATENT DOCUMENTS

| | | | |
|---|---|---|---|
| 2019/0384845 A1* | 12/2019 | Saxena | ............. G06F 16/24545 |
| 2020/0050694 A1 | 2/2020 | Avalani et al. | |
| 2021/0117382 A1 | 4/2021 | Sriharsha | |
| 2021/0200765 A1 | 7/2021 | Sahu et al. | |
| 2021/0294603 A1* | 9/2021 | Kasture | ............... G06F 15/8061 |
| 2021/0390075 A1* | 12/2021 | Wang | ................... G06F 16/245 |
| 2023/0161792 A1 | 5/2023 | Pandis et al. | |

* cited by examiner

METHODS AND SYSTEMS FOR PERFORMING DATABASE OPERATIONS

CROSS-REFERENCE TO RELATED APPLICATION(S)

This application is continuation of U.S. patent application Ser. No. 18/237,529, filed on Aug. 24, 2023, which is a continuation of International Application Serial No. PCT/NZ2023/050002, filed Jan. 19, 2023, which claims priority to and the benefit of Australian Patent Application Serial No. 2022900112, filed Jan. 21, 2022, the entire disclosures of which are hereby incorporated by reference.

TECHNICAL FIELD

Embodiments generally relate to systems, methods and computer-readable media for performing database operations. In particular, described embodiments relate to systems, methods and computer-readable media for performing bulk read queries on a database.

BACKGROUND

When working with data within a database structure, it is often necessary to perform various operations on the data. For example, it may be necessary to query the data in various ways, such as to read certain entries of the database. While performing queries may be relatively straightforward on small databases, the larger the database the more computationally intensive it becomes to perform a read query.

Furthermore, certain database architectures may add complexity to performing queries. For example, a database may be sharded across multiple database servers. This results in increased latency when performing queries, especially where multiple shards of the database are to be searched. Furthermore, multi-tenanted databases may provide further complications when it comes to running a query, as the database may still need to be accessible to other tenants while the query is being performed.

It is desired to address or ameliorate one or more shortcomings or disadvantages associated with prior systems for performing database operations, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a method for performing a query operation on a database, the method comprising: selecting a connection to the database from a plurality of connections to the database, the connections being arranged within a data structure and each having a predetermined number of query slots; waiting for a query slot to be available on the selected connection; in response to at least one query slot being available, taking one of the at least one available slots; reordering the plurality of connections within the data structure; causing the query to execute at least partially using the accessed query slot; and releasing the query slot.

According to some embodiments, causing the query to execute comprises asynchronously performing the query operation via the connection by sending the query.

Some embodiments further comprise receiving a query result.

According to some embodiments, the database is a sharded database and the method is performed for each shard.

In some embodiments, the database is a multi-tenant database, and wherein the database remains available to access by each tenant while the method is being performed.

In some embodiments, the data structure is at least one of a list, queue or heap.

According to some embodiments, the data structure is a priority heap.

In some embodiments, selecting the connection to the database comprises selecting the connection at the root of the priority heap, and wherein reordering the plurality of connections within the data structure comprises placing the selected connection at the bottom of the priority heap to cause the priority heap to be re-ordered.

According to some embodiments, the sorting is performed based on a <0, 0, >0 pattern of each connection's number of available query slots.

Some embodiments further comprise: waiting for access to a query runner module to become available before selecting the connection to the database, in response to access to the query runner module being available, preventing other processes from accessing the query runner module; and after reordering the data structure, allowing other processes to access the query runner module.

Some embodiments further comprise determining whether access to the query runner module is available by accessing query runner access control data.

In some embodiments, the query runner access control data includes at least one query runner access control value, and wherein preventing other processes from accessing the query runner module comprises setting the query runner access control value to a first value, and allowing other processes to access the query runner module comprises setting the query runner access control value to a second value.

According to some embodiments, the query runner access control value comprises a query runner semaphore, so that preventing other processes from accessing the query runner module comprises taking the query runner semaphore, and allowing other processes to access the query runner module comprises releasing the query runner semaphore.

Some embodiments further comprise, after reordering the data structure, opening the selected connection.

Some embodiments further comprise: waiting for access to a connection to become available before performing the query operation, in response to access to the connection being available, preventing other processes from performing a query operation via the connection; and after performing the query operation, allowing other processes to access the connection to perform query operations.

Some embodiments further comprise determining whether access to the connection module is available by accessing connection access control data.

According to some embodiments, the connection access control data includes at least one connection access control value, and wherein preventing other processes from accessing the connection comprises setting the connection access control value to a first value, and allowing other processes to access the connection comprises setting the connection access control value to a second value.

In some embodiments, the connection access control value comprises a connection semaphore, so that preventing other processes from accessing the connection comprises taking the connection semaphore, and allowing other processes to access the connection comprises releasing the connection semaphore.

In some embodiments, waiting for a query slot to be available on the selected connection comprises reading a maximum queries control value, taking one of the at least one available slots comprises one of incrementing or decrementing the maximum queries control value, and releasing the query slot comprises the other of incrementing or decrementing the maximum queries control value.

According to some embodiments, the maximum queries control value comprises a maximum queries semaphore.

Some embodiments relate to a device comprising: a memory storing executable code; a processor configured to access the memory to execute the executable code; wherein when executing the executable code, the processor is caused to perform the method of some other embodiments.

Some embodiments relate to a computer-readable storage medium storing instructions that, when executed by a processor, cause the processor to perform the method of any one of some other embodiments.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

Various ones of the appended drawings merely illustrate example embodiments of the present disclosure and cannot be considered as limiting its scope.

DETAILED DESCRIPTION

Embodiments generally relate to systems, methods and non-transitory computer-readable media or medium for performing database operations. In particular, described embodiments relate to systems, methods and computer-readable media for performing bulk read queries on a database.

Sharded database structures can be computationally expensive and time consuming to query, especially where multiple shards are to be searched, where multiple queries are being executed, and/or where the queries are computationally intensive. Previous techniques have used multiple processor cores executing individual threads to run each query to completion. While this means several queries can be run in parallel, this approach uses a lot of resources and can be extremely time consuming. For example, even with 8 threads running in parallel, only around 20 executions may be achieved per second, meaning it could take several hours to run a list of approximately 3.5 million queries. Furthermore, much of the time spent in running queries in this manner is spent in waiting for the query to be returned, meaning that the processor is wasting time waiting on data to be received from the database being queried.

Described embodiments relate to a method for performing read queries on a database that uses an asynchronous technique to reduce the time spent in waiting for queries to be returned. By using the asynchronous method, the number of executions possible per second may be increased to around 13,000 per second, meaning that a list of approximately 3.5 million queries could be completed within several minutes rather than several hours. Furthermore, the method uses an adaptive queuing technique to reduce the risk of overloading the connections to the database. The method may be particularly beneficial when performing operations on a sharded database. By creating multiple connections with each shard, and running multiple queries via each connection, multiple queries can be executed on multiple shards simultaneously. The method reduces the computational burden of performing bulk read query operations, and may significantly reduce the time taken to perform such operations. Furthermore, where the database is multi-tenanted, the shards may remain under operation and available to access by the other tenants.

Figure 1:
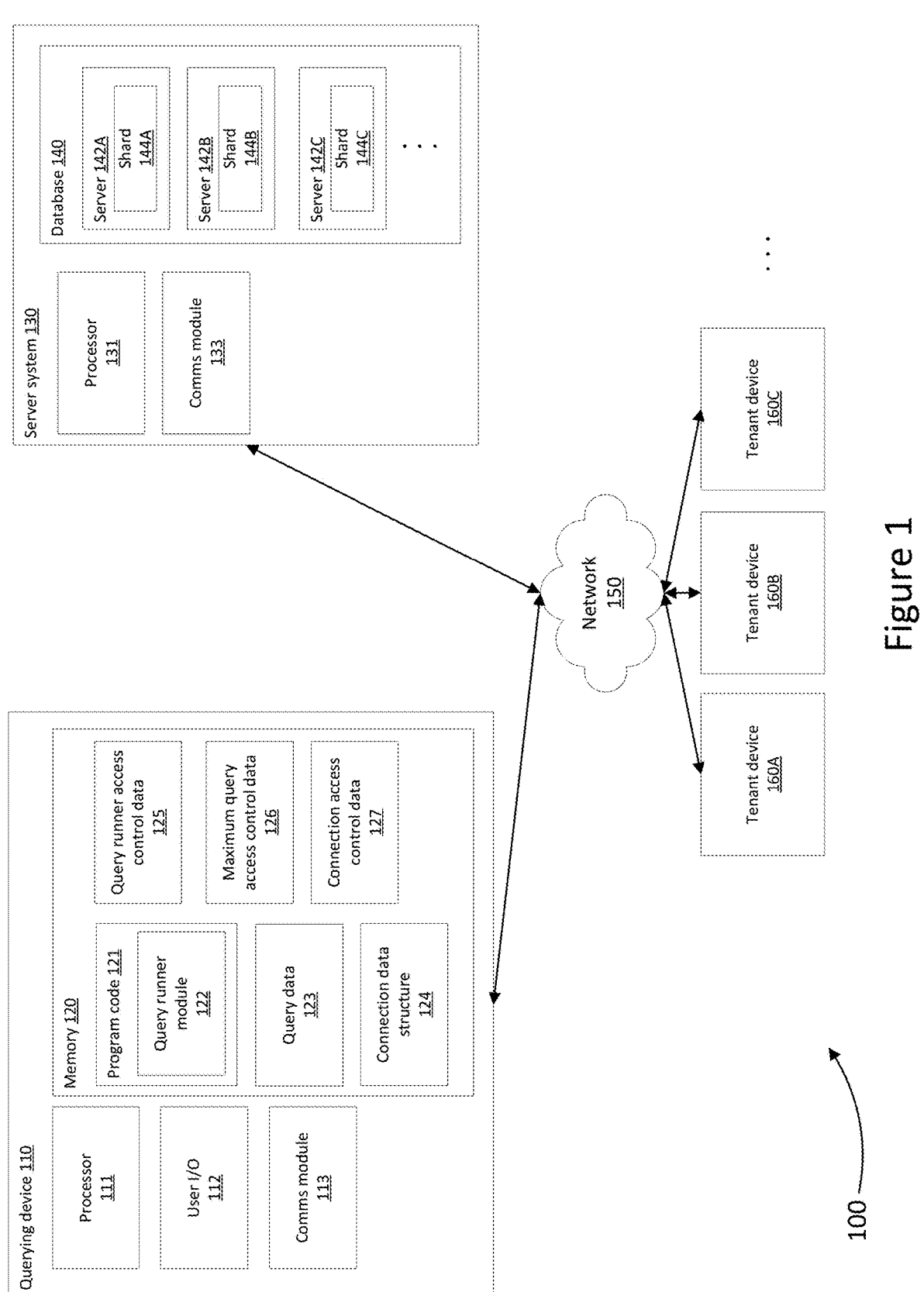
FIG. 1 is a schematic diagram of a system for performing database operations, according to some embodiments.

FIG. 1 is a block diagram of a system 100 for performing database operations. System 100 comprises a querying device 110 and a server system 130 accessible to querying computing device 110 via a network 150. Server system 130 stores a database 140 configured to be queried by querying device 110. While the illustrated embodiment shows querying device 110 as independent of server system 130, according to some embodiments one or more parts of these devices and systems may be integrated. For example, according to some embodiments, querying device 110 may form part of server system 130.

Querying device 110 comprises a processor 111 in communication with a memory 120. Processor 111 comprises one or more data processors for executing instructions, and may comprise one or more microprocessor-based platforms, central processing units (CPUs), application specific instruction set processors (ASIPs), application specific integrated circuits (ASICs), suitable integrated circuits, or other processors capable of fetching and executing instruction code as stored in memory 120. Processor 111 may include an arithmetic logic unit (ALU) for mathematical and/or logical execution of instructions, such as operations performed on data stored in internal registers of processor 111.

Memory 120 may comprise one or more memory storage locations, which may be volatile or non-volatile memory types. For example, memory 120 may comprise one or more of random access memory (RAM), read-only memory (ROM), electrically erasable programmable read-only memory (EEPROM) or flash memory. Memory 120 is configured to store program code 121 accessible by the processor 111. Program code 121 may comprise a plurality of executable program code modules executable by processor 111 to cause processor 111 to perform functions as described in further detail below. For example, processor 111 may comprise a query runner module 122 which, when executed, may cause processor 111 to query database 140. According to some embodiments, separate instances of query runner module 122 may be executed for every shard of database 140 that is to be queried.

Memory 120 may also comprise one or more data files comprising data that is accessible to processor 111 for performing read and write functions. For example, memory 120 may store query data 123 for storing queries to be executed with respect to database 140.

Memory 120 may also store a connection data structure 124 for storing data relating to connections made with database 140. According to some embodiments, an individual connection database 140 may be stored for each shard of database 140. According to some embodiments, each data entry within connection data structure 124 is used to store data relating to one connection made with the particular shard of database 140 that the connection data structure 124 relates to. Connection data structure 124 may be a list, queue or heap in some embodiments. For example, connection data structure 124 may be an interval heap, priority heap or a priority queue. According to some embodiments, connection data structure 124 may comprise a double-ended priority queue. According to some embodiments, connection data structure 124 may be any data structure that allows for a random or pseudo-random shuffling of data entries. According to some embodiments, connection data structure 124 may be any data structure that allows for a random or pseudo-random shuffling of data entries while allowing for equitable distribution of data entries.

According to some embodiments, connection data structure 124 may be periodically shuffled, sorted, and/or at least loosely shuffled or sorted. For example, connection data structure 124 may be biased to place data indicative of connections with the highest number of queries queued and the highest number of open query slots toward the highest precedence node in the structure, which may be at the top or front of the structure, while minimizing the number of connections open. According to some embodiments, the position of data indicative of connections within connection data structure 124 may be a factor of whether that connection has any query slots open, and how many queued connections it has. A sorting algorithm that may be used to shuffle or sort connection data structure 124 is described below in further detail with reference to FIG. 3.

Memory 120 may also store a number of variables for the purpose of controlling access to various resources. These may be in the form of semaphores and/or mutually exclusive flags (mutexes) in some embodiments. For example, memory 120 may comprise one or more of query runner access control data 125, maximum query access control data 126 and/or connection access control data 127.

According to some embodiments, query runner access control data 125 may be configured to store access data usable to control and/or synchronize access to the query runner module 122. Query runner access control data 125 may be used to ensure that processor 111 executing query runner module 122 is determining a connection with database 140 for only one query at a time. According to some embodiments, query runner access control data 125 may comprise data that takes on one value when access to the query runner module 122 is available for the purpose of determining a connection with database 140, and a different value when such access is not available. According to some embodiments, query runner access control data 125 may store access control data for each shard of database 140. In some embodiments, the access control data may comprise one or more semaphores or mutexes or access control flags. According to some embodiments, each stored semaphore may be a binary semaphore.

Maximum query access control data 126 may be configured to store access data usable to control and/or synchronize the maximum number of queries that can be executed via any connection with database 140. Maximum query access control data 126 may be used to ensure that any single connection with database 140 is not overloaded with queries. According to some embodiments, maximum query access control data 125 may comprise individual access control data values for each connection with database 140.

For example, if a maximum number of three connections can be established for each shard of database 140, maximum query access control data 126 may store an access control data value for each of the three connections for each shard. Each access control data value may indicate a maximum number of queries that the respective connection can handle. According to some embodiments, each access control data value may define a number of query slots corresponding to a maximum number of queries that the respective connection can handle, such that each query slot can be used to execute one query. For example, it may be determined that each connection can handle a maximum of 20 queries in some embodiments. In this case, an access control data value may be given the value 20, to define the 20 query slots available on the connection. Each access control data value may be decremented as each query slot on the respective connection is claimed to execute queries, and incremented as queries complete and the query slots are released. According to some embodiments, each access control data value may comprise one or more semaphores or mutexes. According to some embodiments, each stored query semaphore may be a counting semaphore, storing a value corresponding to a predetermined maximum number of queries to be executed via each connection made with database 140, being the number of available query slots on that connection.

Connection access control data 127 may be configured to store access data usable to control and/or synchronize access to each established connection with database 140. According to some embodiments, connection access control data 127 may be used by processor 111 to allow only one query to be executed at any time for each connection. According to some embodiments, connection access control data 127 may comprise individual access control data values for each connection with database 140. According to some embodiments, each individual access control data value may comprise data that takes on one value when access to the respective connection is available for the purpose of executing a query, and a different value when such access is not available. In some embodiments, each access control data value may comprise one or more semaphores or mutexes or access control flags. According to some embodiments, each stored semaphore may be a binary semaphore.

Querying device 110 may also comprise user input and output (user I/O 112) capable of receiving inputs, such as queries, from one or more users of querying device 110, and capable of conveying outputs, such as information, to the user. User I/O 112 may comprise one or more user interface components, such as one or more of a display device, a touch screen display, a keyboard, a mouse, a camera, a microphone, and buttons, for example.

Querying device 110 may further comprise a communications module 113 configured to facilitate communication between querying device 110 and one or more external computing devices via one or more networks. Communications module 113 may comprise a combination of network interface hardware and network interface software suitable for establishing, maintaining and facilitating communication over a relevant communication channel. According to some embodiments, communications module 113 may facilitate communication between querying device 110 and other devices within system 100 via network 150. For example, communications module 113 may facilitate communication between querying device 110 and server system 130.

Network 150 may comprise one or more local area networks or wide area networks that facilitate communication between elements of system 100. For example, according to some embodiments, network 150 may be the internet.

However, network 150 may comprise at least a portion of any one or more networks having one or more nodes that transmit, receive, forward, generate, buffer, store, route, switch, process, or a combination thereof, etc. one or more messages, packets, signals, some combination thereof, or so forth. Network 150 may include, for example, one or more of: a wireless network, a wired network, an internet, an intranet, a public network, a packet-switched network, a circuit-switched network, an ad hoc network, an infrastructure network, a public-switched telephone network (PSTN), a cable network, a cellular network, a satellite network, a fiber-optic network, or some combination thereof.

Server system 130 may comprise one or more computing devices and/or server devices, such as one or more servers, databases, and/or processing devices in communication over a network. According to some embodiments, server system 130 may comprise a cloud-based server system. Memory 120 comprises a processor 131 in communication with a database 140. Processor 131 comprises one or more data processors for executing instructions, and may comprise one or more microprocessor-based platforms, central processing units (CPUs), application specific instruction set processors (ASIPs), application specific integrated circuits (ASICs), suitable integrated circuits, or other processors capable of fetching and executing instruction code. Processor 131 may include an arithmetic logic unit (ALU) for mathematical and/or logical execution of instructions, such as operations performed on the data stored in internal registers of processor 131.

Database 140 may comprise one or more data storage locations comprising a data structure. According to some embodiments, database 140 may comprise a sharded database, wherein shards of database 140 are stored individually. According to some embodiments, shards of database 140 may be stored in different physical locations. According to some embodiments, database 140 may comprise a plurality of individual servers 142 storing individual shards 144 making up the database structure. Each shard 144 may comprise one or more data entries accessible to processor 131 for read and write operations. While the illustrated embodiment shows three servers 142A, 142B and 142C storing three shards 144A, 144B and 144C, this is illustrated as an example only and any number of servers 142 and shards 144 may exist within database 140.

Server system 130 may further comprise a communications module 133 configured to facilitate communication between server system 130 and one or more external computing devices via one or more networks. Communications module 133 may comprise a combination of network interface hardware and network interface software suitable for establishing, maintaining and facilitating communication over a relevant communication channel. According to some embodiments, communications module 133 may facilitate communication between server system 130 and other devices within system 100 via network 150. For example, communications module 133 may facilitate communication between server system 130 and querying device 110 via network 150.

According to some embodiments, database 140 may be a multi-tenant database accessible to a number of tenant devices. FIG. 1 illustrates a number of tenant devices 160 in communication with server system 130 via network 150. While the illustrated embodiment shows three tenant devices 160A, 160B and 160C, this is illustrated as an example only and any number of tenant devices 160 may exist within system 100. Tenant devices 160 may comprise computing devices such as laptop computers, desktop computers, tablet computing devices and/or smart phones, in some embodiments. According to some embodiments, one or more of tenant devices 160 may operate as querying devices 110. According to some embodiments, database 140 may be accessible to more than a million specific tenants. For example, database 140 may be accessible to around 3.5 million tenants in some embodiments.

Figure 2:
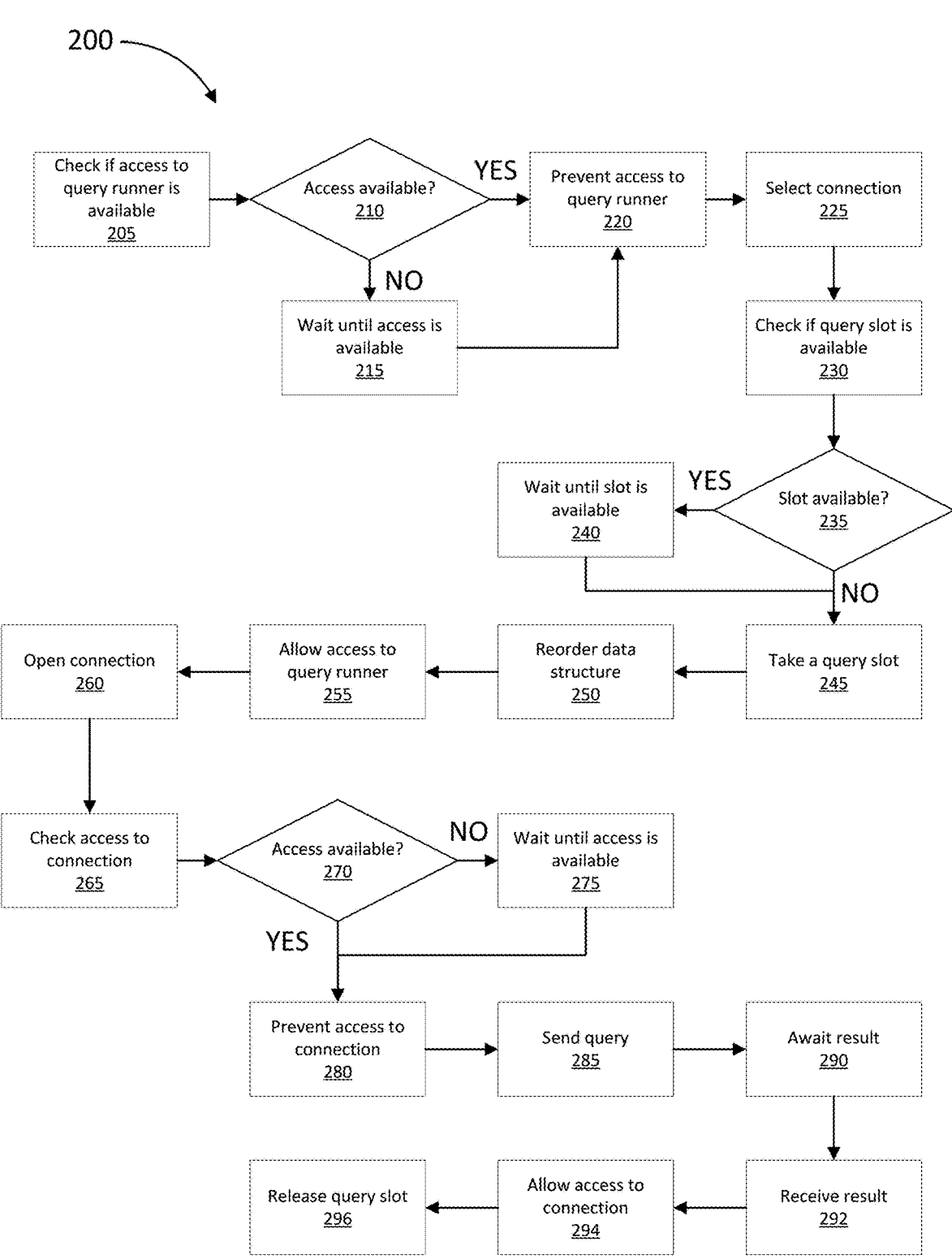
FIG. 2 is a process flow diagram of a method for performing database operations, according to some embodiments.

FIG. 2 is a process flow diagram of a method 200 performed by processor 111 of querying device 110 when caused to execute program code 121, and specifically query runner module 122. Method 200 relates to a method for querying database 140. According to some embodiments, processor 111 may be caused to execute query runner module 122 when a user input is received by user I/O 112 indicating that a user of querying device 110 wishes to query database 140. According to some embodiments, the desired one or more queries may be input by the user using user I/O 112, and stored by processor 111 in query data 123. According to some embodiments, processor 111 may be caused to execute an instance of query runner module 122 for each shard 144 in database 140.

At step 205, processor 111 executing program code 121 is caused to determine whether access to query runner module 122 is available for the purpose of establishing a connection with database 140. According to some embodiments, processor 111 may do this by accessing and/or reading a value from query runner access control data 125, and determining whether that value corresponds to query runner module 122 being available. Query runner access control data 125 may store a flag, mutex or semaphore that is of a first value when access is available, and is of a second value when access isn't available. For example, query runner access control data 125 may store a value of 1 when access is available, and store a value of 0 when access isn't available.

At step 210, based on the value retrieved from query runner access control data 125, processor 111 executing program code 121 determines whether access to query runner module 122 for the purpose of determining a connection with database 140 is available. If processor 111 determines that access is available, processor 111 proceeds to perform step 220. If processor 111 determines that access is not available, which may be due to an instance of query runner module 122 already executing, processor 111 proceeds to perform step 215.

At step 215, processor 111 executing program code 121 is caused to wait until access to query runner module 122 is available. This may occur once the instance of query runner module 122 that is already executing progresses to a step where further access to query runner module 122 becomes permissible, as described below with reference to step 255. Processor 111 may determine that access to query runner module 122 is available when a value stored in query runner access control data 125 changes from the second value indicating that access isn't available to the first value that indicates that access is available, as described above with reference to step 205. Once processor 111 determines that access is available, processor 111 proceeds to perform step 220.

At step 220, processor 111 executing program code 121 is caused to prevent further access to query runner module 122, to avoid multiple queries from determining a connection with database 140 simultaneously, so that only one query is determining its connection at a time. According to some embodiments, processor 111 may prevent further access to query runner module 122 by modifying a value stored in query runner access control data 125 from the first value indicating that access is available, to the second value that indicates that access isn't available. For example, processor 111 may do this by accessing or taking a semaphore stored in query runner access control data 125, or by setting a flag stored in query runner access control data 125.

At step 225, processor 111 now executing query runner module 122 is caused to select a connection via which to perform the query. According to some embodiments, processor 111 may be caused to select a connection from connection data structure 124. For example, where connection data structure 124 is a list or queue, processor 111 may be caused to select the highest precedence node, which may be the connection that is placed at the top or the bottom of the list, or the front or back of the queue. Where connection data structure 124 is a heap, processor 111 may be caused to select the highest precedence node, which may be the connection at the top or the bottom of the heap, and which might be the root of the heap. According to some embodiments, where connection data structure 124 is shuffled, sorted or at least loosely shuffled or sorted in a way that is biased to place connections that already have queued queries toward the highest precedence node of the structure, this may cause processor 111 to select a connection with queued queries, preventing a new connection from being established and reducing the number of active connections required. According to some embodiments, where connection data structure 124 is shuffled, sorted or at least loosely shuffled or sorted in a way that is biased to place connections with the highest number of available query slots toward the highest precedence node of the structure, this may cause processor 111 to select the connection with the highest number of available query slots. According to some embodiments, processor 111 may alternatively be configured to select a connection from elsewhere within the data structure. According to some embodiments, the connection may be selected at random.

At step 230, processor 111 executing query runner module 122 is caused to determine whether any query slots are available on the connection selected at step 225. According to some embodiments, processor 111 may do this by accessing or reading a value from maximum query access control data 126 that corresponds to the selected connection, and determining whether that value corresponds to any query slots being available. Maximum query access control data 126 may store a value indicating the number of query slots available for each connection. In some embodiments, this may be a counter that starts at zero and counts up until a predetermined maximum query slot value. In this case, processor 111 may determine whether any query slots are available by comparing the stored value with the predetermined maximum query slot value. If the stored value is lower than the predetermined maximum query slot value, processor 111 may determine that at least one query slot is available. In some embodiments, maximum query access control data 126 may store a counter that starts at a predetermined maximum query slot value and counts down until zero. In this case, processor 111 may determine whether any query slots are available by comparing the stored value with zero. If the stored value is higher than zero, processor 111 may determine that at least one query slot is available.

At step 235, based on the value retrieved from maximum query access control data 126, processor 111 executing query runner module 122 determines whether a query slot is available on the selected connection. If processor 111 determines that a query slot is available, processor 111 proceeds to perform step 245. If processor 111 determines that no slots are available, which may be due to the maximum number of queries already being executed on the selected connection, processor 111 proceeds to perform step 240.

At step 240, processor 111 executing query runner module 122 is caused to wait until a query slot becomes available. This acts as a non-deterministic pressure release valve to reduce the risk of overloading the connection, which may lead to denial-of-service (DOS), and to reduce sustained query pressure on the selected connection. A query slot may become available once a different instance of query runner module 122 that is already executing progresses to a step where a query slot is released, as described below with reference to step 296. Processor 111 may determine that a query is available based on a change in value stored in maximum query access control data 126, as described above with reference to step 230. Once processor 111 determines that a query slot is available, processor 111 proceeds to perform step 245.

At step 245, processor 111 executing query runner module 122 is caused to access an available query slot and make that slot unavailable for access by other processes, to avoid more than the predetermined maximum number of queries from being executed via the selected connection. According to some embodiments, processor 111 may make a slot unavailable by modifying a value stored in maximum query access control data 126. This may be by incrementing or decrementing the stored value, in some embodiments.

At step 250, processor 111 executing query runner module 122 is caused to reorder or arrange the connections within connection data structure 124. According to some embodiments, processor 111 does this by partially or at least loosely shuffling or resorting the connections. In some embodiments, the connections within connection data structure 124 are shuffled or resorted randomly. According to some embodiments, the resorting is a pseudo-random re-sorting with a bias on connections having available query slots. The reordering of the connections may result in an adaptive queuing technique, as reordering the connections within the structure may cause a change in the order of the next connection to be selected from the connection data structure 124 at step 225. According to some embodiments, the reordering of connections may be performed according to method 300, as described below in further detail with reference to FIG. 3.

Where connection data structure 124 is a priority heap, processor 111 may perform the reordering by taking the connection selected at step 225, and placing this at the bottom of the heap based on standard heap manipulation to cause the heap to be resorted. This may cause a pseudo-random sort of the connections within the heap. According to some embodiments, the sorting may be performed based on the $<0, 0, >0$ pattern or $[-1, 0, +1]$ pattern of each node's current number of available query slots. According to some embodiments, the sort may be used to front load the heap with connections that already have queries running in order to use as few connections as possible. However, according to some embodiments, the order of the heap will not be correct during or after construction of the heap, such that in fact the ordering merely results in a cheap or "loose" shuffling operation of the connections within the heap. This may be done in order to restrict the amount of time spent balancing the load between the connections stored within the heap, while still causing a self-balancing behavior.

At step 255, having acquired a query slot for the query operation, processor 111 executing query runner module 122 is caused to re-allow access to query runner module 122, to allow a new query to commence determining a connection with database 140. According to some embodiments, processor 111 may re-allow access to query runner module 122 by modifying a value stored in query runner access control data 125 from the second value indicating that access is not available, to the first value that indicates that access is available. For example, processor 111 may do this by releasing a semaphore stored in query runner access control data 125, or by clearing a flag stored in query runner access control data 125.

At step 260, processor 111 executing query runner module 122 is caused to open the selected connection with database 140, and/or to determine that the selected connection with database 140 is open, to allow for a query operation to be performed.

At step 265, processor 111 executing query runner module 122 is caused to determine whether access to the opened connection is available for the purpose of performing a query operation. According to some embodiments, processor 111 may do this by reading a value from connection access control data 127, and determining whether that value corresponds to the connection being available. Connection access control data 127 may store a flag, mutex or semaphore that is of a first value when access is available, and is of a second value when access isn't available. For example, connection access control data 127 may store a value of 1 when access is available, and store a value of 0 when access isn't available.

At step 270, based on the value retrieved from connection access control data 127, processor 111 executing query runner module 122 determines whether access to the connection is available. If processor 111 determines that access is available, processor 111 proceeds to perform step 280. If processor 111 determines that access is not available, which may be due to a query already being performed via the connection, processor 111 proceeds to perform step 275.

At step 275, processor 111 executing query runner module 122 is caused to wait until access to the connection is available. This may occur once a query already executing via the connection progresses to a step where the query is complete, as described below with reference to step 294. Processor 111 may determine that access to the connection is available when a value stored in connection access control data 127 changes from the second value indicating that access isn't available to the first value that indicates that access is available, as described above with reference to step 265. Once processor 111 determines that access is available, processor 111 proceeds to perform step 280.

At step 280, processor 111 executing query runner module 122 is caused to prevent further access to the connection, to avoid multiple queries from executing via the connection simultaneously, so that only one query is being performed via each connection at a time. According to some embodiments, processor 111 may prevent further access to the connection by modifying a value stored in connection access control data 127 from the first value indicating that access is available, to the second value that indicates that access isn't available. For example, processor 111 may do this by taking a semaphore stored in connection access control data 127, or by setting a flag stored in connection access control data 127.

At step 285, processor 111 executing query runner module 122 is caused to send the query to database 140 via the connection for execution. According to some embodiments, to reduce the lag associated with waiting for network traffic, the query is sent asynchronously. The query may be sent by communications module 113 via network 150, and received by communications module 133 of server system 130. The query may then be executed by processor 131 with respect to the shard 144 corresponding to the connection with database 140.

At step 290, processor 111 executing query runner module 122 is caused to wait for the result of the query to be returned from database 140, while the query is executed and returned.

At step 292, processor 111 executing query runner module 122 receives the result of the query from database 140. The result may be sent by communications module 133 via network 150, and received by communications module 113 of the querying device 110. According to some embodiments, the received result may be processed using interrupts, to allow for the asynchronous sending and receiving of the query and result.

At step 294, having received the result of the query, processor 111 executing query runner module 122 is caused to re-allow access to the connection, to allow a new query to be executed via the connection. According to some embodiments, processor 111 may re-allow access to the connection by modifying a value stored in connection access control data 127 from the second value indicating that access is not available, to the first value that indicates that access is available. For example, processor 111 may do this by releasing a semaphore stored in connection access control data 127, or by clearing a flag stored in connection access control data 127.

At step 296, processor 111 executing query runner module 122 is caused to release the query slot, to allow a new query to be assigned to the connection. According to some embodiments, processor 111 may release the query slot by modifying a value stored in maximum query access control data 126. For example, processor 111 may do this by decrementing or incrementing a value stored in maximum query access control data 126, being the opposite of the operation performed at step 245.

Figure 3:
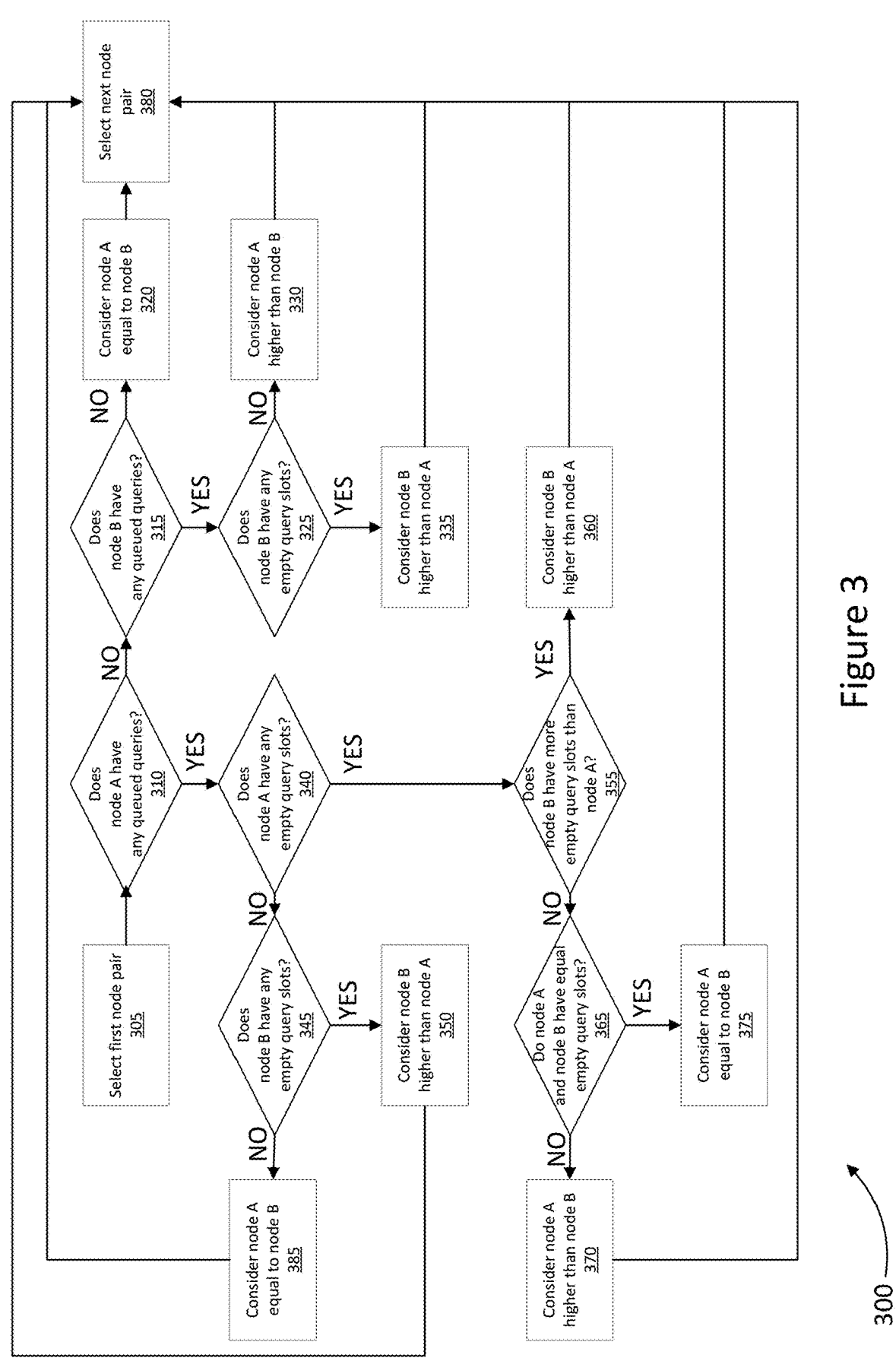
FIG. 3 is a process flow diagram of a method for shuffling data within a data structure, according to some embodiments.

FIG. 3 is a process flow diagram of a method 300 performed by processor 111 of querying device 110 when caused to execute program code 121, and specifically query runner module 122. In particular, method 300 may be performed during step 250 of method 200. Method 300 relates to a method for sorting or shuffling data in connection data structure 124, in a way that causes the highest precedence node to be biased toward holding data relating to connections that have queued queries and have query slots available. This helps ensure as few connections as possible are active, while reducing the risk of a connection becoming overloaded.

According to some embodiments, method 300 may be performed on every connected node pair within connection data structure 124. In some embodiments, method 300 may be performed on a subset of connected node pairs within connection data structure 124.

Method 300 starts at step 305, where processor 111 executing query runner module 122 is caused to select a first node pair of connection data structure 124 to process. According to some embodiments, the node pair is a connected node pair, where the nodes are adjacent to one another and connected to one another within the structure. According to some embodiments, the first selected node pair may be the highest precedence node and a node connected to the highest precedence node. In some embodiments, the first selected node pair may be selected from the bottom or back of the structure, and may be the lowest precedence node pair in some embodiments. For the purpose of this document, the nodes in the selected node pair are designated "node A" and "node B".

At step 310, processor 111 executing query runner module 122 is caused to check whether node A has any queued queries, which may be done by checking the value of maximum query access control data 126 corresponding to node A.

If processor 111 determines that node A does not have any queued queries, then at step 315, processor 111 executing query runner module 122 is caused to check whether node B has any queued queries, which may be done by checking the value of maximum query access control data 126 corresponding to node B.

If processor 111 determines that node B does not have any queued queries, then at step 320, processor 111 executing query runner module 122 determines node A to be of equal precedence to node B. This is because both node A and node B have no queued queries, and so either of the nodes can be used to execute a new query. According to some embodiments, processor 111 may leave these nodes in their previous positions without swapping or otherwise moving them. Processor 111 may then move to step 380, at which processor 111 may select a new node pair to process, as described in further detail below.

If at step 315 processor 111 determines that node B does have at least one queued query, then at step 325, processor 111 executing query runner module 122 checks whether node B has any empty query slots. This may be done by checking the value of maximum query access control data 126 corresponding to node B, and comparing it to the maximum value of maximum query access control data 126 or to zero, depending on whether maximum query access control data 126 is configured to count up or down as queries as queued.

If processor 111 determines that node B does not have any empty query slots, then at step 330 processor 111 executing query runner module 122 determines that node A should have higher precedence than node B. This is because while node A has no active connections, node B is full. Processor 111 may swap the positions of node A or B to cause node A to be closer to the highest precedence node, the top, or the front of connection data structure 124. Where node A already had higher precedence, processor 111 may leave these nodes in their previous positions without swapping or otherwise moving them. Processor 111 may then move to step 380, at which processor 111 may select a new node pair to process, as described in further detail below.

If at step 325 processor 111 determines that node B does have at least one empty query slot, then at step 335, processor 111 executing query runner module 122 determines that node B should have higher precedence than node A. This is because node A has no active connections, and so using node B will keep the number of active nodes lower. Processor 111 may swap the positions of node A or B to cause node B to be closer to the highest precedence node, the top, or the front of connection data structure 124. Where node B already had higher precedence, processor 111 may leave these nodes in their previous positions without swapping or otherwise moving them. Processor 111 may then move to step 380, at which processor 111 may select a new node pair to process, as described in further detail below.

Going back to step 310, if at that step processor 111 determines that node A does have at least one queued query, then processor 111 instead moves to step 340. At step 340, processor 111 executing query runner module 122 checks whether node A has any empty query slots. This may be done by checking the value of maximum query access control data 126 corresponding to node A, and comparing it to the maximum value of maximum query access control data 126 or to zero, depending on whether maximum query access control data 126 is configured to count up or down as queries as queued.

If processor 111 determines that node A does not have any empty query slots, then at step 345 processor 111 executing query runner module 122 checks whether node B has any empty query slots. This may be actioned by checking the value of maximum query access control data 126 corresponding to node B, and using a comparison it to the maximum value of maximum query access control data 126 or to zero, depending on whether maximum query access control data 126 is configured to count up or down as queries as queued.

If processor 111 determines that node B does not have any empty query slots, then at step 385 processor 111 executing query runner module 122 determines node A to be of equal precedence to node B. This is because both node A and node B are full, and can't be used to queue any new queries. According to some embodiments, processor 111 may leave these nodes in their previous positions without swapping or otherwise moving them. Processor 111 may then move to step 380, at which processor 111 may select a new node pair to process, as described in further detail below.

If at step 345 processor 111 determines that node B does have at least one empty query slot, then at step 350 processor 111 executing query runner module 122 determines that node B should have higher precedence than node A. This is because node A has no empty query slots while node B does, and so using node B will avoid overloading node A. Processor 111 may swap the positions of node A or B to cause node B to be closer to the highest precedence node, the top, or the front of connection data structure 124. Where node B already had higher precedence, processor 111 may leave these nodes in their previous positions without swapping or otherwise moving them. Processor 111 may then move to step 380, at which processor 111 may select a new node pair to process, as described in further detail below.

If at step 340 processor 111 determines that node A does have empty query slots, then processor 111 moves to step 355. At step 355, processor 111 executing query runner module 122 checks whether node B has more empty query slots than node A. This may be done by checking the value of maximum query access control data 126 corresponding to node B, and comparing it to the value of maximum query access control data 126 corresponding to node A.

If processor 111 determines that node B does have more empty query slots than node A, then at step 360 processor 111 determines that node B should have higher precedence than node A. This is because node B has more empty query slots, and so using node B will avoid overloading node A. Processor 111 may swap the positions of node A or B to cause node B to be closer to the highest precedence node, the top, or the front of connection data structure 124. Where node B already had higher precedence, processor 111 may leave these nodes in their previous positions without swapping or otherwise moving them. Processor 111 may then move to step 380, at which processor 111 may select a new node pair to process, as described in further detail below.

If at step 355 processor 111 determines that node B does not have more empty query slots than node A, then at step 365 processor 111 executing query runner module 122 determines whether nodes A and B have an equal number of empty query slots.

If processor 111 determines that nodes A and B do have the same number of empty query slots, then at step 375 processor 111 determines node A to be of equal precedence to node B. According to some embodiments, processor 111 may leave these nodes in their previous positions without swapping or otherwise moving them. Processor 111 may then move to step 380, at which processor 111 may select a new node pair to process, as described in further detail below.

If at step 365 processor 111 determines that nodes A and B do not have an equal number of empty query slots, then at step 370 processor 111 executing query runner module 122 determines that node A should have higher precedence than node B. This is because node A has more empty query slots, and so using node A will avoid overloading node B. Processor 111 may swap the positions of node A or B to cause node A to be closer to the highest precedence node, the top, or the front of connection data structure 124. Where node A already had higher precedence, processor 111 may leave these nodes in their previous positions without swapping or otherwise moving them. Processor 111 may then move to step 380, at which processor 111 may select a new node pair to process, as described in further detail below.

At step 380, processor 111 executing query runner module 122 selects a new node pair to process. According to some embodiments, processor 111 may select the pair with the next highest precedence to the pair previously processed. In some embodiments, processor 111 may select the pair with the next lowest precedence to the pair previously processed. Where all connected pairs have already been processed, processor 111 may instead determine that method 300 is complete.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. A method for adaptively queuing connections to a database, the method comprising:

accessing a data structure comprising a plurality of nodes, wherein each node corresponds to a connection to the database and has an associated number of empty query slots;

selecting a first node and a second node from within the data structure, wherein the first node and the second node are adjacent nodes;

determining whether a precedence value of the first node is equal, higher or lower than a precedence value of the second node, wherein the precedence value of a node corresponds to a number of empty query slots associated with that node;

based on the determination, determining an action to perform on the first node and the second node;

performing the determined action; and selecting a new pair of nodes to process.

2. The method of claim 1, wherein the data structure is a priority heap.

3. The method of claim 1, wherein the first node is the node having a highest position in the data structure.

4. The method of claim 1, wherein the first node is the node having a lowest position in the data structure.

5. The method of claim 1, wherein the precedence value of the first node is considered to be equal to the precedence value of the second node if the first node and the second node have an equal number of empty query slots.

6. The method of claim 1, wherein the precedence value of the first node is considered to be higher than the precedence value of the second node if the first node has a higher number of empty query slots than the second node.

7. The method of claim 1, wherein the precedence value of the first node is considered to be lower than the precedence value of the second node if the first node has a lower number of empty query slots than the second node.

8. The method of claim 1, wherein the action to perform is swapping a position of the first node with the second node.

9. The method of claim 8, wherein this action is performed if the second node has a higher precedence value than the first node.

10. The method of claim 8, wherein this action is performed if the nodes have equal precedence values or if the first node has a higher precedence value than the second node.

11. The method of claim 1, wherein the action to perform is not changing a position of the first node or the second node.

12. The method of claim 11, wherein this action is performed if the nodes have equal precedence values or if the first node has a higher precedence value than the second node.

13. The method of claim 11, wherein this action is performed if the second node has a higher precedence value than the first node.

14. The method of claim 1, wherein selecting the new pair of nodes to process comprises selecting a new pair of nodes having a next highest precedence to a pair previously processed.

15. The method of claim 1, wherein selecting the new pair of nodes to process comprises selecting a new pair of nodes having a next lowest precedence to a pair previously processed.

16. The method of claim 1, further comprising performing a query operation on the database by:

selecting a connection to the database from the connections to the database, the connections being arranged within a data structure and each having a predetermined number of query slots;

accessing an available query slot of the predetermined number of query slots;

causing the query operation to execute at least partially using an accessed query slot; and releasing the accessed query slot.

17. The method of claim 16, wherein the database is a sharded database and the method is performed for each shard.

18. The method of claim 16, wherein the database is a multi-tenant database, and wherein the database remains available to access by each tenant while the method is being performed.

19. A device for adaptively queuing connections to a database, the device comprising:

a processor; and a memory, the memory storing instructions executable by the processor;

wherein, when the processor executes the instructions stored in the memory, the processor is caused to:

access a data structure comprising a plurality of nodes, wherein each node corresponds to a connection to the database and has an associated number of empty query slots;

select a first node and a second node from within the data structure, wherein the first node and the second node are adjacent nodes;

determine whether a precedence value of the first node is equal, higher or lower than a precedence value of the second node, wherein the precedence value of a node corresponds to the number of empty query slots associated with that node;

based on a comparison, determine an action to perform on the first node and the second node;

perform the determined action; and select a new pair of nodes to process.

20. A non-transitory computer-readable storage medium storing instructions that, when executed by a processor, cause the processor to perform a method for adaptively queuing connections to a database, the method comprising:

accessing a data structure comprising a plurality of nodes, wherein each node corresponds to a connection to the database and has an associated number of empty query slots;

selecting a first node and a second node from within the data structure, wherein the first node and the second node are adjacent nodes;

determining whether a precedence value of the first node is equal, higher or lower than a precedence value of the second node, wherein the precedence value of a node corresponds to the number of empty query slots associated with that node;

based on a comparison, determining an action to perform on the first node and the second node;

performing the determined action; and selecting a new pair of nodes to process.

* * * * *